Nov. 7, 1933.  M. VOS  1,934,574

MEANS FOR CONVERTING THE FREQUENCY OF ELECTRIC OSCILLATIONS

Filed March 14, 1930

M. Vos
INVENTOR

By: Marks Klein
Attys.

Patented Nov. 7, 1933

1,934,574

UNITED STATES PATENT OFFICE 1,934,574

MEANS FOR CONVERTING THE FREQUENCY OF ELECTRIC OSCILLATIONS

Mauritz Vos, Stockholm, Sweden, assignor to Telefonaktiebolaget L. M. Ericsson, Stockholm, Sweden Application March 14, 1930, Serial No. 435,982, and in Sweden March 21, 1929

1 Claim. (Cl. 250—36)

The present invention relates to the generation of electric oscillations of wanted frequency by converting a suitable fundamental frequency. The invention consists substantially in that the fundamental frequency is applied to the grid circuit in an electronic valve having a negative grid biasing voltage of such a value that anode current is produced in the valve only during a part of each positive half-cycle of the fundamental wave, a short current impulse in the anode circuit being thus produced for each cycle of the fundamental oscillation. In the anode circuit said current impulses act impulsing upon one or more oscillatory circuits each tuned to one of the higher harmonics of the fundamental frequency.

Figure 1:
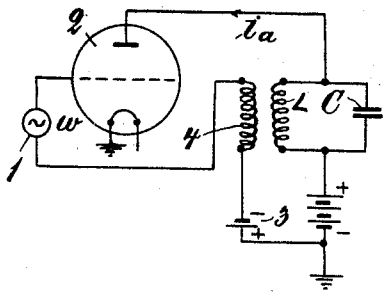
Figure 4:
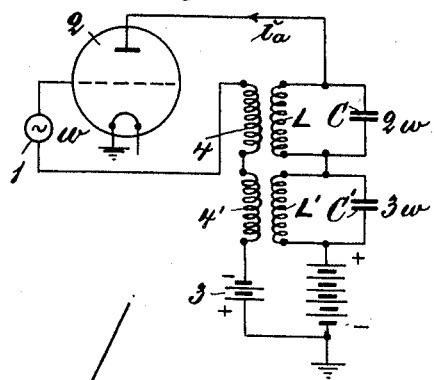
Figure 2:
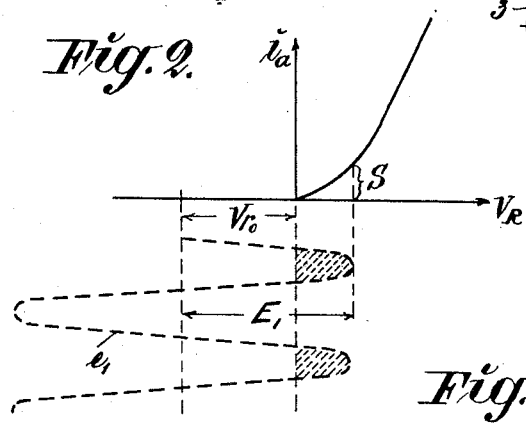
Figure 3:
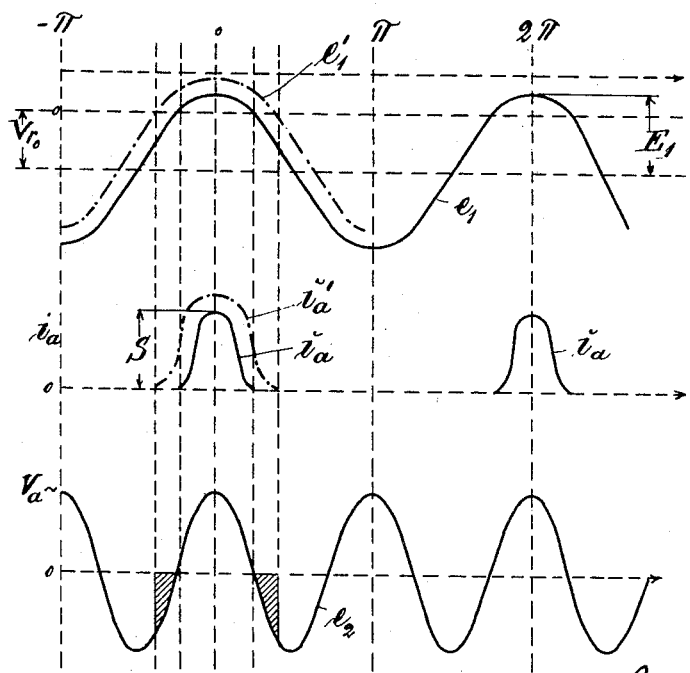

The invention will be more closely described with reference to the accompanying drawing on which Figure 1 shows diagrammatically an embodiment of the circuit arrangement according to the invention. Figure 2 is a diagram. Figure 3 is an oscillatory diagram. Figure 4 shows an embodiment having several tuned oscillatory circuits in the anode circuit. In the circuit arrangement according to Figure 1 an oscillatory generator 1 having the frequency $$\frac{\omega}{2\pi}$$

is connected to the grid circuit in a three-electrode valve 2 which is supplied with a negative grid biasing voltage from a grid biasing battery 3. The anode circuit includes an oscillatory circuit tuned to a higher harmonic of the fundamental frequency and composed of an inductance L and a capacity C.

In order to reduce the damping in the oscillating system and thus obtain an improved efficiency the anode circuit is back-coupled to the grid circuit by means of a re-generative coil 4 included in series with the generator 1 said coil being inductively coupled to the inductance L. The re-generative circuit is preferably so adjusted that the electronic valve is compounded in a manner known per se (see Swedish Patent No. 62,633), i. e. so that the reaction of the anode load upon the control voltage of the valve is neutralized. This takes place if $$\delta V_{a2} + \frac{V_a}{\mu} = 0$$

where $V_{a2}$ is the anode alternating voltage, $\delta V_{a2}$ the voltage retransferred from the anode circuit to the grid circuit, and $\mu$ the amplification factor of the valve. In this case the control voltage contains only the supplied fundamental frequency whereas the voltages otherwise derived from the reaction of the anode circuit and having other frequencies are neutralized by the compounding. In certain cases the coupling coefficient between the coils L and 4 may be given a higher value than that corresponding to the compounding proper, in other words, the valve may then be over-compounded. The regeneration must, however, not be carried so far that the point of silence is reached or passed in which case there is risk for self-oscillations being produced in the valve. It is, however, generally preferred to make use of the compounding proper as the dimensioning of the arrangement only in this case may be easily and exactly pre-calculated. In compounding proper the dynamic characteristic of the valve will namely coincide with the static one and obtains practically the shape of a parabola branch as seen from Figure 2 showing said characteristic for the electronic valve i. e. the graphically represented relation between the control voltage $V_r$ and the anode current $i_a$.

As seen from Figure 2 where the variations in the control voltage are illustrated by the dotted sinus line representing the supplied fundamental oscillation $e_1$, and from the uppermost diagram in Figure 3 showing the same curve, the negative grid biasing voltage is so selected that the constant component $V_{r0}$ of the resulting control voltage is less than the amplitude $E_1$ of the supplied fundamental oscillation $e_1$, but, however, of such a value that only the peaks of the positive half-wave of the fundamental frequency are able to produce any anode current. Anode current will thus only be flowing during those moments when the curve for the fundamental oscillation $e_1$ passes to the positive side of the ordinate axis in Figure 2 or over the zero line in Figure 3 respectively. During each of said short moments a current impulse is thus produced in the anode circuit which is illustrated by the middle diagram in Figure 3. Said impulses in the anode circuit evidently succeed each other in an interval of time of $$\frac{2\pi}{\omega}.$$

The current impulses, as is readily understood from the two lowermost diagrams in Figure 3, will evidently each be in phase with one positive half-wave of the voltage of a higher harmonic of the fundamental frequency caused by said current impulses. To impart an energy of oscillation as great as possible by means of the current impulses it is evidently necessary that said impulses are not of longer duration than the half-waves of the voltage of the higher harmonic in question. From this the conclusion is made that the voltage peaks projecting above the zero line in the uppermost diagram in Figure 1 should have a duration which is shorter, the higher is the order of the higher harmonic to be produced and to which the oscillatory circuit L, C is tuned.

The course of the second harmonic $e_2$ of the fundamental oscillation $e_1$ is illustrated in Figure 3 in full lines. The negative value of the grid biasing voltage is so selected that each one of the current impulses $i_a$ succeeding each other in the interval of time $$\frac{2\pi}{\omega}$$

in the anode circuit obtains substantially the same duration as the positive voltage half-waves being in phase with said impulses and appertaining to the second harmonic $e_2$ to which the oscillatory circuit L, C may be tuned, in other words, the duration of each one of the current impulses $i_a$ should be substantially equal to half the period of oscillation of the higher harmonic in question. In the uppermost diagram in Figure 3, $V_{ro}$ represents the constant component of the resulting control voltage at a suitable selection of the negative grid biasing voltage to produce the second harmonic. If the grid biasing voltage is instead adjusted to a less value so that the constant component of the control voltage is reduced to $V_{ro}'$ the variable component of the control voltage, while maintaining the amplitude $E_1$, will instead follow the course indicated by the dashed and dotted sinusoidal curve $e_1'$ in the uppermost diagram 3. The positive voltage peaks projecting above the zero line obtain thus an increased width. The duration of the current impulses $i_a'$ produced in this case in the anode circuit is increased in a corresponding degree and becomes essentially longer than half the period of oscillation in the wanted second harmonic. The current impulses $i_a'$ will thus partially cover also the negative half-waves of the higher harmonic and will thus counter-act the generation of the higher harmonic during those moments of the negative half-waves which in the lowermost diagram in Figure 3 are represented by the cross-hatched surfaces.

If it is desired to generate instead a harmonic of a higher order, by way of example the third harmonic, the absolute value of the grid biasing voltage should be increased to such a value that the peaks of the fundamental oscillation projecting above the zero line and the current impulses then produced obtain a duration or a width corresponding to the duration of the positive voltage half-waves in the produced third or higher of the harmonics to which the oscillatory circuit L, C in this case is tuned.

The circuit arrangement according to the invention may also be used as a multiple generator, two or more oscillatory circuits being connected to the anode circuit and each tuned to one higher harmonic of the fundamental oscillation. Figure 4 shows an embodiment of this kind in which the anode circuit includes two oscillatory circuits whereof the one L, C is tuned, by way of example, to the second harmonic $$\frac{\omega}{\pi}$$

and the other oscillatory circuit L', C' to the third harmonic $$\frac{3\omega}{2\pi}.$$

The grid circuit includes two series connected regenerative coils 4 and 4' respectively which are inductively coupled each to one of the inductances L, L'.

As no self-oscillations occur in an arrangement according to the invention and said arrangement thus does not operate as an oscillator in the ordinary meaning of the word, the generated oscillations are obtained as integer multiples of the supplied fundamental oscillation.

I claim:—

A circuit arrangement for generating oscillations of desired frequency comprising in combination, an electronic valve, means for supplying a fundamental wave to the grid of a frequency which is an aliquot fraction of the desired frequency and of predetermined amplitude, means impressing a negative grid biasing voltage of such a value that the constant component of the resulting control voltage is smaller than said amplitude, an oscillatory circuit tuned to the desired frequency and connected to the anode circuit, and inductive means connecting said oscillatory circuit with the grid circuit and adapted to retransfer substantially the fraction $$\frac{1}{\mu}$$

of the anode voltage as a compensating voltage $\mu$ being the amplification coefficient, thereby eliminating substantially the reaction of the anode potential on the control voltage.

MAURITZ VOS.